Aug. 11, 1959  C. A. MORRISON  2,898,803
DUST METER
Filed Oct. 17, 1956  4 Sheets-Sheet 1

CHARLES A. MORRISON
INVENTOR.

BY

ATTORNEYS

Aug. 11, 1959　　　C. A. MORRISON　　　2,898,803
DUST METER
Filed Oct. 17, 1956　　　4 Sheets-Sheet 2
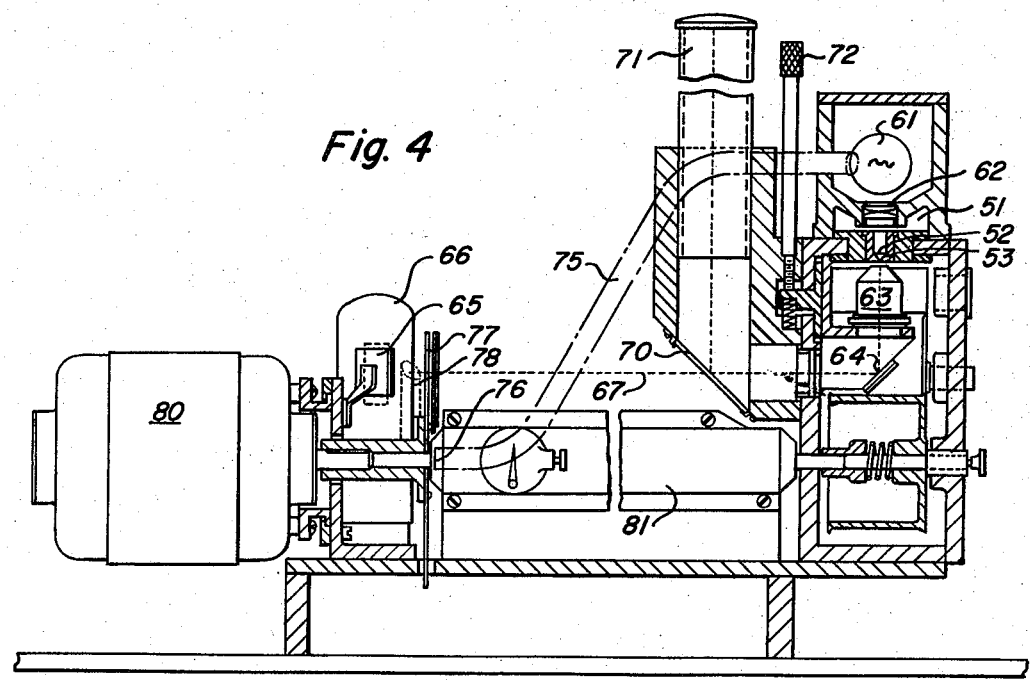
Fig. 4
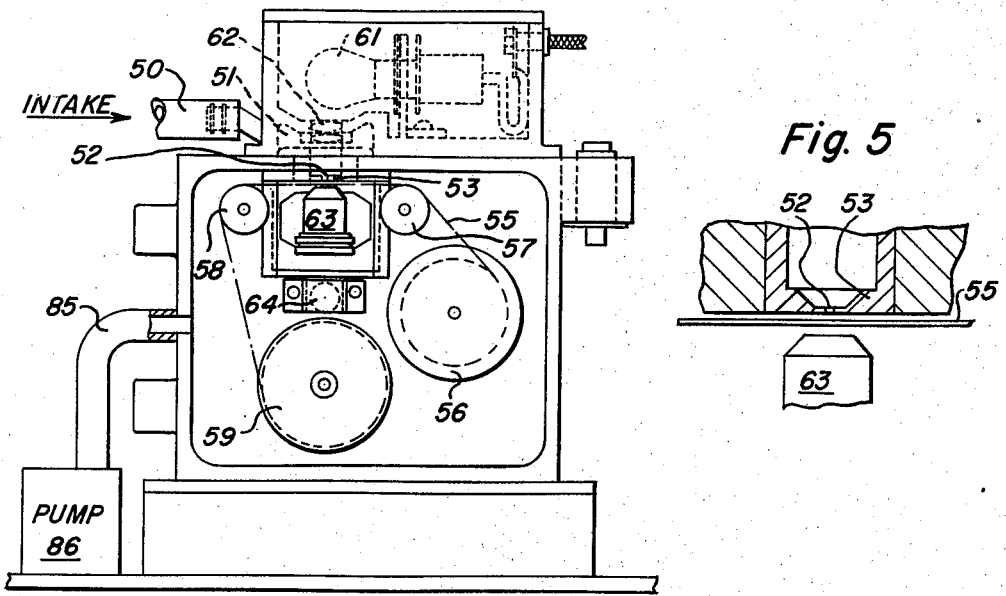
Fig. 3
Fig. 5
CHARLES A. MORRISON
INVENTOR.
BY
ATTORNEYS Aug. 11, 1959   C. A. MORRISON   2,898,803
DUST METER
Filed Oct. 17, 1956   4 Sheets-Sheet 3

CHARLES A. MORRISON
INVENTOR.

BY

ATTORNEYS

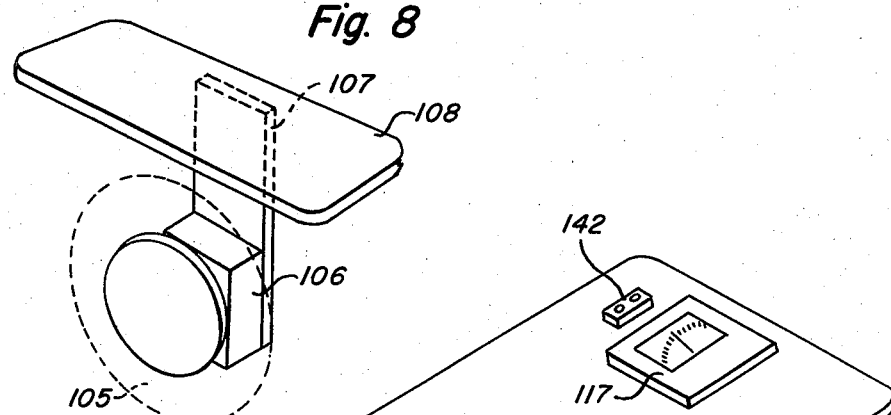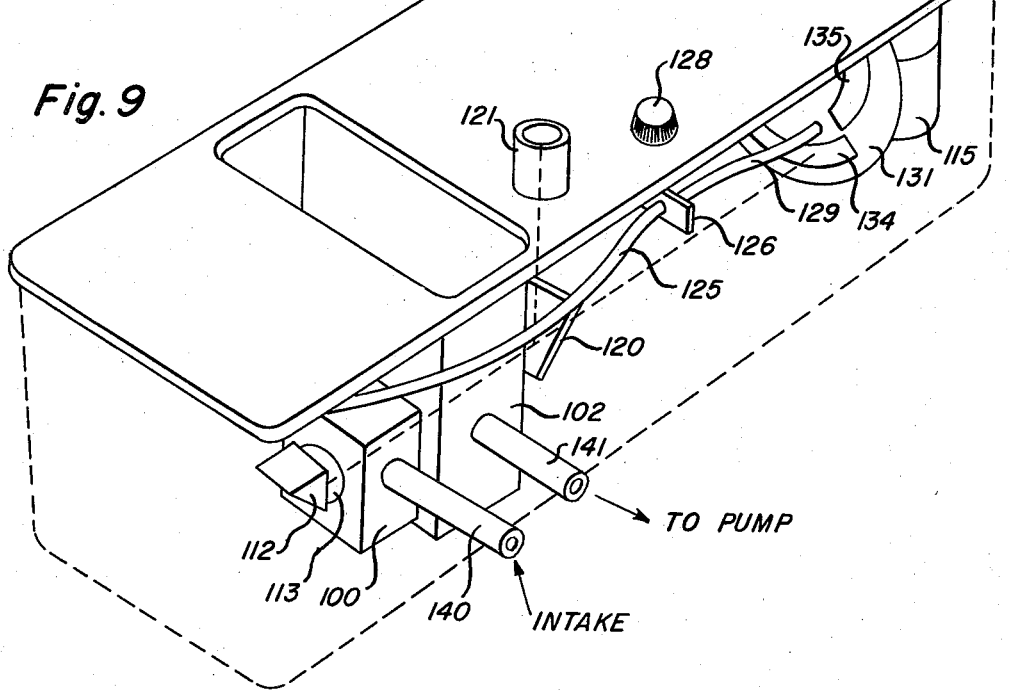

United States Patent Office 2,898,803
Patented Aug. 11, 1959

2,898,803

DUST METER

Charles A. Morrison, Rochester, N.Y., assignor to Eastman Kodak Company, Rochester, N.Y., a corporation of New Jersey Application October 17, 1956, Serial No. 616,536

2 Claims. (Cl. 88—14)

This invention relates to dust meters and particularly to an improved form of the meter described in U.S. Patent 2,310,871 Robertson.

It is an object of the invention to provide an instrument for measuring dust in the atmosphere. It is a particular object of the invention to provide a dust meter with such a great range of sensitivity that it can measure not only the dust content of a heavily dust laden atmosphere but also the residual dust content in extremely clean atmosphere from which the dust has been removed by dry or wet filtering.

It is an object of a preferred form of the invention to provide for continuous sampling of the atmosphere and to provide high precision independent of changes in pressure at the orifice through which the test atmosphere is pumped.

It is also an object of the invention to measure and record the dust content as the atmosphere is being sampled.

According to the invention the dust meter involves a plate with a fine orifice through which the atmosphere is passed by suitable pumping means, from one side to the other. A firm sheet which is transparent or translucent is located in the air stream or atmosphere stream and is moved slowly and steadily through the stream (i.e. past the orifice) so that dust deposits on this sheet. There are various reasons why the dust adheres to the sheet. It is directed against the sheet with some force. It is probably moist because of the expansion of the atmosphere at the orifice. It may have received electrical charge while passing through the orifice. In any case, the dust does stick to the sheet. Preferably the sheet is supported freely enough for it to assume the Bernoulli distance from the orifice. Providing the pressure difference at the orifice exceeds some value a little greater than half an atmosphere, the volume of air per unit time passing through the orifice remains very constant. To avoid passing the test air through a pump before it reaches the orifice, the pressure difference is provided by a vacuum pump on the low pressure side to draw the air through. This means that the maximum pressure difference is about 1 atmosphere. Thus the preferred range is 0.53 to 1.0 atmospheres. Air velocities through an orifice are substantially constant at pressures within this range (see "Principles of Chemical Engineering," 3rd edition (1937), page 67, by Walker, Lewis, MacAdam and Gilliland).

The optical density of the track is measured by locating a photoelectric densitometer in line with the track. Preferably the densitometer is arranged to measure transmitted density and still more preferably the densitometer is located right at the orifice so that it measures the density of the track as it is being made. This requires the light source of the densitometer to be effectively on one side of the orifice and the photoelectric receiving means to be optically on the other side of the orifice.

The form of densitometer is not a critical part of the present invention. For example, the densitometer may be arranged to measure the density directly or by comparing the intensity of the light transmitted through the track with light directly from the light source. The latter arrangement compensates for variations in intensity of the source, as is well known in densitometry. Of course, the track density may be recorded on a continuously moving chart. When "clean" atmospheres are being tested, the densitometer is adjusted to have high sensitivity so that it responds to very slight differences in the density of a relatively low density track.

For simple precise operation, various features of the instrument should be within the following ranges. The orifice in the plate is preferably rectangular or at least has two sides parallel to each other and transverse (perpendicular) to the direction of movement of the receiving sheet. This insures uniformity of deposit at the center of the track and out beyond the area in which measurements are made. The size of the orifice is not critical except that it cannot be so small that it clogs with dust or interferes with the width of the beam required for the densitometer and it cannot be so large that it becomes difficut to maintain sufficient pressure difference and other factors involved in the Bernoulli effect, discussed in more detail below. The area of the light beam must be large enough to average the effect of individual dust particles. Thus for practical reasons the orifice is made more than .001 inch wide and more than .01 inch long, the length being transverse to the track. The upper limit for the orifice dimensions (still permitting convenient pumping arrangements) are those giving an area up to one-fiftieth of a square inch. The pressure difference on the two sides of the orifice should be between that equivalent to 16 to 30 inches of mercury (i.e. .53 to 1 atmosphere). Depending on the size of the orifice this causes the stream to move through the orifice with a velocity between 1 cubic inch and 10 cubic inches per second. The dust receiving sheet should be pliant but at least quite firm or stiff so as properly to position itself at the Bernoulli distance. Ordinary plastic film about 3-thousandths of an inch thick mounted as a disc or as a band stretched between a supply spool and takeup spool is flexible enough to bend and move to the Bernoulli position and yet firm enough to hold this position without collapsing. The dust deposits on the sheet as it moves past the orifice. The primary purpose of the instrument is to measure extremely clean atmospheres for residual dust and accordingly the receiving sheet is moved very slowly past the orifice in order to build up quite a dense dust deposit or at least a deposit dense enough for precise measurement of its density. Preferably the rate of moving the sheet is between 0.1 and 10 inches per hour.

The instrument gives an accurate measure of dust conditions within seconds and provides a continuous record of dust levels. When set at high sensitivity, it will detect and record a change in the dust content of a room 10 x 15 x 8 feet when a few thousandths of an inch of fine dust covering the head of a pencil is dispersed throughout the room. A puff of cigarette smoke in the same size room would require a lower sensitivity setting.

The invention and its advantages will be more fully understood from the following description of preferred embodiments thereof when read in connection with the accompanying drawings in which:

Figs. 3 and 4 are respectively front and side elevations partly in section of a slightly different embodiment of the invention;

Fig. 5 is an enlarged view of the orifice arrangement;

Fig. 8 is a perspective view of the receiving unit; and

Fig. 9 is a perspective view with part of the housing removed of the form shown in Fig. 7.

Figure 1:
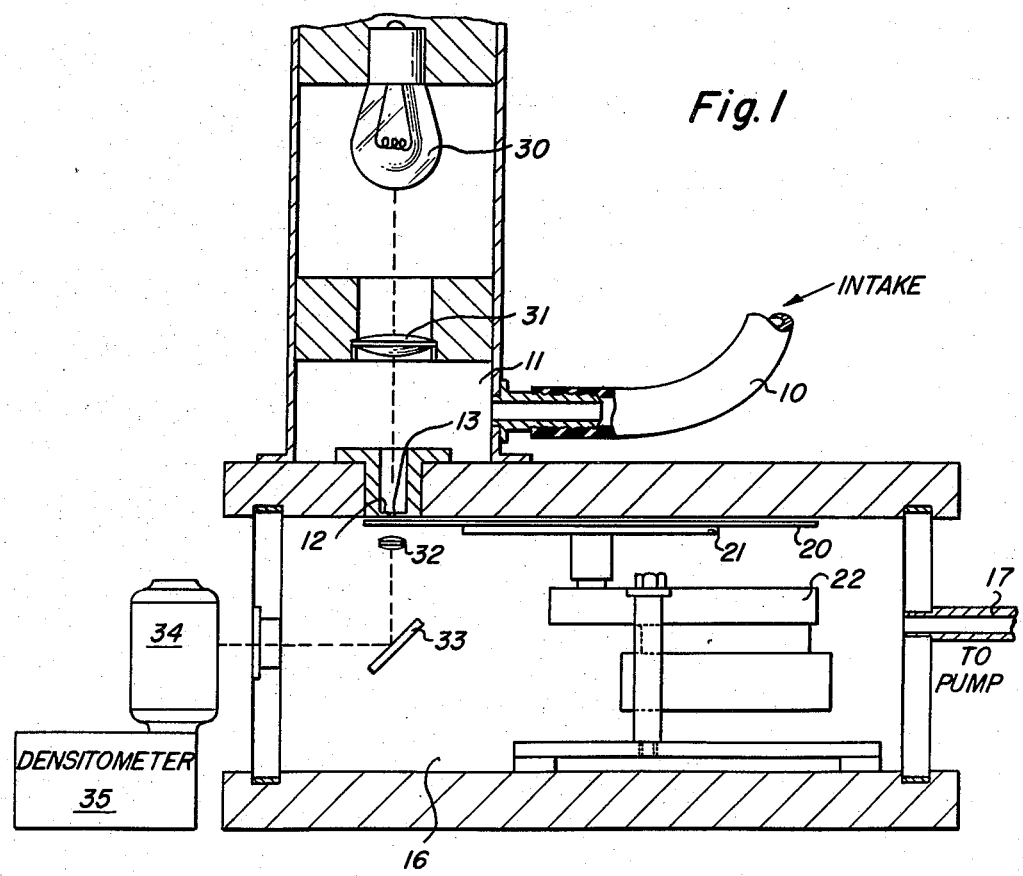
Fig. 1 is a cross section of the essential features of one preferred embodiment of the invention.

In Fig. 1 the atmosphere whose dust content is to be measured is passed through intake 10 into a chamber 11 and through an orifice 13 in a plate 12. The orifice is rectangular .042 by .007 inch (i.e. about .0003 square inch in area). In order to cause the atmosphere to flow through the orifice 13 the pressure in chamber 16 is maintained by suitable vacuum pumps connected to the outlet 17, at a pressure less than 14 inches of mercury. Thus the pressure on the two sides of the plate 12 differs by between 16 and 30 inches of mercury. A transparent disc 20 carried on a rigid disc 21 except for the marginal areas is held in the air stream as it emerges from the orifice 13. The sheet 20 is .003 inch thick cellulose acetate which is flexible enough to assume the Bernoulli distance from the orifice 13. Suitable clock mechanism 22 rotates the disc 21 and the sheet 20 at a rate which may be set by suitable gearing to provide one revolution per hour, one revolution per 12 hours or one revolution per 100 hours which means that the point of measurement on the disc moves past the orifice respectively at speeds of 12.5, 1.05 or 0.126 inches per hour, the corresponding transit times being 2, 24 and 200 seconds respectively. These latter figures are the times required for a point on the disc to pass the orifice. Actually tests show that the instrument responds to dust introduced to the intake in approximately 0.25, 3 and 30 seconds respectively in each of the cases. Adding a length of hose increases the delay time between the introduction of dust and the response. For example, each 10 ft. of $\frac{5}{16}''$ tubing on the intake adds about 2.4 seconds to the above values in delay time.

Light from a lamp 30 is focussed by a lens 31 on the orifice 13 and passes through the orifice and through the transparent sheet 20. This light is picked up by a lens 32 and reflected by a mirror 33 to a photoelectric cell 34 of densitometer 35. The light may pass either way through the orifice 13; that is, the lamp may be on either side of the orifice and the photocell on the other side. Alternatively and less preferably the density of the track may be measured by the transmission or reflection at a point some distance from the orifice 13. This, of course, introduces additional delay time which is objectionable for many purposes.

Figure 2:
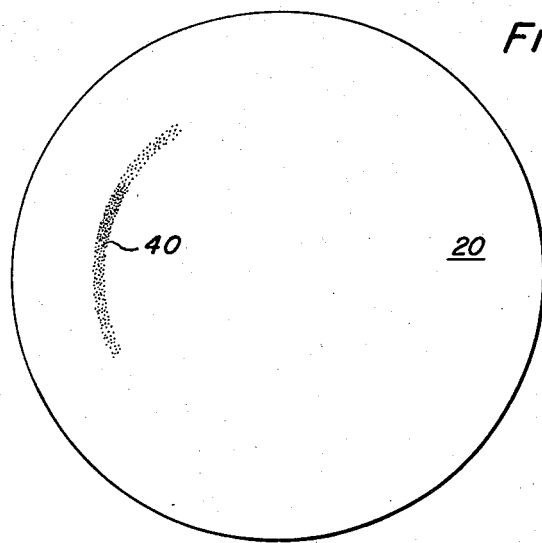
Fig. 2 illustrates the form of dust deposits on a receiving disc employed in Fig. 1.

The front view of the disc 20 in Fig. 2 shows a typical track 40 deposited thereon.

A somewhat different embodiment of the invention is shown in Figs. 3 to 6. In this embodiment the atmosphere to be tested is drawn in through tube 50 into a chamber 51 and out of this chamber through an orifice 52 in a plate 53. Intercepting the air stream from orifice 52 is a band 55 of transparent sheeting which moves from a supply roll 56 over rolls 57 and 58 onto a takeup spool 59. As before, the strip or sheet tends to take up the Bernoulli position in front of the orifice 52. Light from a lamp 61 is focussed by lens 62 on the orifice 52 and is transmitted by a lens 63 and mirrors 64 and 65 to phototube 66 of a densitometer unit. A beam splitter 70 is positioned in the light beam to permit direct viewing of the dust deposit as it is being made. In this connection the lens 63 acts as a microscope objective and the lens 71 acts as an eyepiece of the microscope. The microscope is focussed by turning a rod 72.

In this particular embodiment, the densitometer is of the comparison type. A light conductor tube 75 picks up light directly from the lamp 61 and conducts it to the point 76. As the light emerges from the end of the tubing at the point 76 it passes through a shutter 77 (when open) and is reflected by a periscope 78 so that it emerges parallel to the test beam 67 and strikes the mirror 65 which thus reflects both beams or at least either beam into the phototube 66. The shutter 77 rotates at relatively high speed and is arranged alternatively to transmit the test beam 67 and the standard beam passing through the tube 75 to the periscope 78. Thus the densitometer receives the test and standard beams alternately and is arranged, in the usual way, to respond to and record the difference in intensity between these two beams. In this particular embodiment the shutter 77 is driven by an electric motor 80. Through a suitable gear train illustrated schematically at 81 the electric motor 80 also drives the takeup spool 59 very slowly at a speed which causes the band 55 to move past the orifice at a speed between $\frac{1}{10}''$ and 10" per hour. On the other hand, a separate motor, even a simple spring wound clock motor, serves satisfactorily to drive the dust receiving sheet.

The atmosphere to be tested may be pumped in at higher than normal pressure or the pressure differential at the orifice may be created by pumping out the chamber on the lower pressure side of the orifice. The latter arrangement is preferable since there are no pumps on the intake side to interfere with the dust content of the test atmosphere until after the dust record has been made. The chamber is exhausted through outlet 85 by suitable vacuum pump 86 shown schematically.

Figure 6:
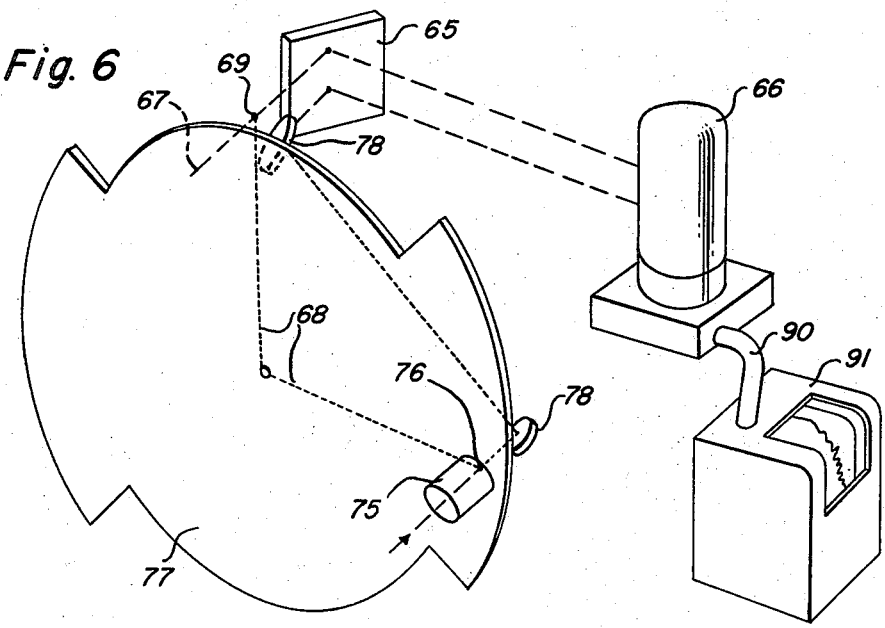
Fig. 6 is a perspective view of the shutter of the embodiment shown in Figs. 3 and 4.

Fig. 6 is included to illustrate the location of the light beams near the photoelectric cell 66. The dotted lines 68 on the shutter 77 are intended to aid the perspective to show that the point 69 (where the ray 67 crosses the plane of the shutter 77) is vertically above the center of the shutter and, relative to this center, is spaced 90° from the point 76 (where the light emerging from the tube 75 strikes the plane of the shutter). This photocell is connected by an electric cable 90 to a recording densitometer 91 which for convenience is usually carried in a separate case. Thus, the instrument is conveniently supplied in two units which are connected by the cable 90 when set up to make a reading and recording. The vacuum pump may be in either case but is more convenient in the case with the test chamber.

Figure 7:
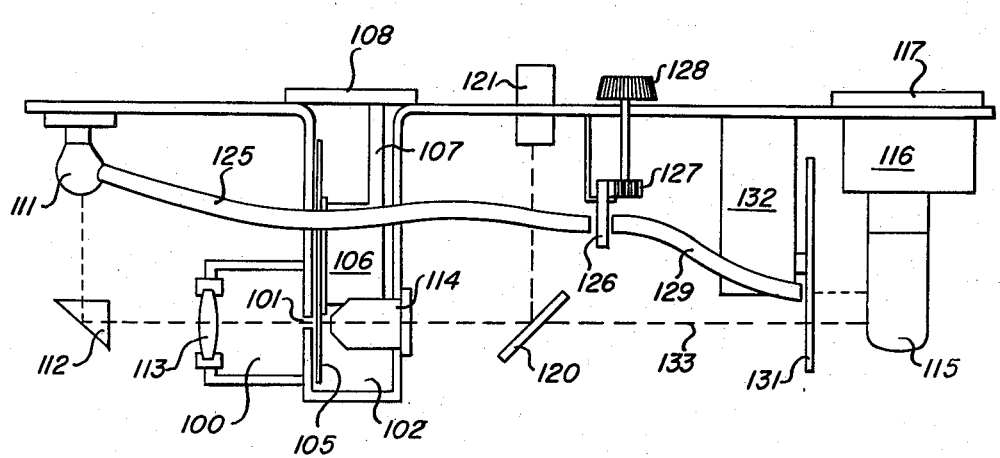
Fig. 7 is a vertical section, partly schematic, of another commercial form of the invention.

Figs. 7, 8 and 9 illustrate the essential features of a relatively inexpensive commercial embodiment of the invention. In this arrangement the air to be tested passes from a chamber 100 through an orifice 101 to a low pressure chamber 102. A transparent disc 105 is rotated slowly by means of a motor 106 in the air stream and at the Bernoulli distance from the orifice 101. In this particular arrangement the motor 106 is carried by a support plate 107 and a cover plate 108 which forms the cover for the low pressure chamber 102. This allows the dust receiving unit to be removed as a whole from the instrument when replacing the receiving sheet 105. Furthermore, inexpensive driving motors such as simple timing motors are available on the market and the price is so low that it is simpler to interchange complete motors than to provide any additional form of gearing when different drive speeds are required.

The intake to chamber 100 is shown at 140 in Fig. 9 and the exhaust of chamber 102 running to the pump is shown at 141. A light from a lamp 111 is reflected by a prism 112 and focussed by a lens 113 on the orifice 101. As this light passes through the orifice and through the dust deposit on the transparent sheet 105, it is focussed by a microscope objective 114 on a shutter 131 behind which a photoelectric cell 115 is located to receive the light when the shutter 131 is open. A beam splitter 120 reflects part of the beam to an eyepiece 121 which, together with the objective 114 forms a microscope for viewing the dust deposit under test. In practice it is highly desirable to be able to view the dust deposit at the same time the density thereof is being measured, especially whenever the density changes suddenly.

In order to provide a comparison beam for the densitometer, light conducting tubes 125 and 129 carry the light directly from the lamp 111 to the shutter 131.

This shutter alternately transmits the direct beam 133 through aperture 134 and the comparison beam from the tube 129 through aperture 135. The alternating current set up in the output of the photoelectric tube 115 is amplified by suitable amplifier 116 and measured on an ammeter 117. Alternatively it may be recorded on a suitable recording instrument connected by jack to the connection indicated schematically at 142. Before any dust is deposited, zero adjustment is provided by moving an optical density wedge 126 located between the tubes 125 and 129. The wedge is driven by a suitable rack and pinion 127, manually operated by a knob 128 located on the top of the instrument. A separate motor 132 is used for driving the shutter which alternatively transmits the test beam and the standard beam.

In most practical work, the absolute dust count is of little importance and accordingly the present instrument is normally used to give relative readings and to indicate when the dust content is above or below some tolerable maximum. Calibration in absolute values of dust content is not necessary or used in practice, although for one specified kind of dust and one standard size of particle, the Bureau of Mines and the Bureau of Standards have worked out ways of calibrating dust meters.

I claim:

1. An instrument for measuring the dust content of an atmosphere comprising a plate with a fine orifice, means for establishing a difference in pressure between .53 and 1 atmosphere on the two sides of the orifice, means for introducing said atmosphere to the high pressure side to flow as a stream through the orifice to the low pressure side, a firm, but flexible sheet, means for supporting the sheet in the emerging stream freely enough to assume the Bernoulli distance from the orifice and for moving the sheet slowly and steadily past the orifice whereby a track of dust is deposited on the sheet, a light source positioned to send light through said orifice and a microdensitometer supported to receive the light through said orifice and track to measure the optical density of the track as it is made.

2. An instrument for measuring the dust content of an atmosphere comprising a plate with an orifice less than .02 square inches in area, two sides of the orifice being parallel and separated more than .001 inches, the other dimension of the orifice being greater than .01 inch, pumping means for establishing a difference in pressure on the two sides of the orifice sufficient to create a stream through the orifice with a velocity between 1 cubic inch and 10 cubic inches per second, a firm, but flexible transparent plastic sheet, means for supporting the sheet in the emerging stream freely enough to assume the Bernoulli distance from the orifice and for moving the sheet steadily past the orifice in a direction substantially at right angles to said parallel sides thereof and at a rate between $1/10$ inch and 10 inches per hour whereby a track of dust is deposited on the sheet, a light source positioned on one side of the orifice to send light through the orifice and sheet and photoelectric densitometer means on the other side of said orifice for receiving the transmitted light and for measuring the density of the track as it is made.

References Cited in the file of this patent

UNITED STATES PATENTS

| | | |
|---|---|---|
| 1,122,229 | Alger | Dec. 22, 1914 |
| 2,076,553 | Drinker et al. | Apr. 13, 1937 |
| 2,310,871 | Robertson | Feb. 9, 1943 |
| 2,312,295 | Dahlman et al. | Feb. 23, 1943 |
| 2,489,286 | Grant | Nov. 29, 1949 |

FOREIGN PATENTS

| | | |
|---|---|---|
| 642,167 | Germany | Feb. 24, 1937 |

OTHER REFERENCES

Article by Owens, "Jet Dust Counting Apparatus," Journal of Industrial Hygiene, vol. 4, 1923, pages 522–534 (pages 524–526 primarily of interest).